United States Patent
Herr et al.

[11] 3,716,269
[45] Feb. 13, 1973

[54] SUNVISOR, ESPECIALLY FOR MOTOR DRIVEN VEHICLES

[75] Inventors: Gerhard Herr, Wuppertal-Elberfeld; Willy O. Treber, Wuppertal-Vohwinkel, both of Germany

[73] Assignee: Gebr. Happich GmbH

[22] Filed: April 28, 1970

[21] Appl. No.: 32,607

[30] Foreign Application Priority Data

May 28, 1969 Germany..................P 19 27 020.3

[52] U.S. Cl. ............................................. 296/97 H
[51] Int. Cl. ................................................ B60j 3/00
[58] Field of Search .296/97 H, 97 R; 160/354, 368 S

[56] References Cited

UNITED STATES PATENTS 2,901,038  8/1959  Herr et al. ...........................296/97 H

FOREIGN PATENTS OR APPLICATIONS 790,534    2/1958   Great Britain......................296/97 H
1,085,136  9/1967   Great Britain......................296/97 H Primary Examiner—Leo Friaglia
Assistant Examiner—John A. Pekar
Attorney—Ostrolenk, Faber, Gerb and Soffen

[57] ABSTRACT

A padded sunvisor for motor vehicles is formed of two layers of material joined along all but one border to form a pocket into which is slipped a correspondingly shaped inner stiffening member, which may be formed of a strong wire frame. After insert of the stiffening member, the slit opening in the visor is closed to surround the stiffening member. Individual sunvisors may be cut from a long rectangular block of material with a stiffening member inserted into the pocket space of each section.

4 Claims, 3 Drawing Figures

PATENTED FEB 13 1973
3,716,269
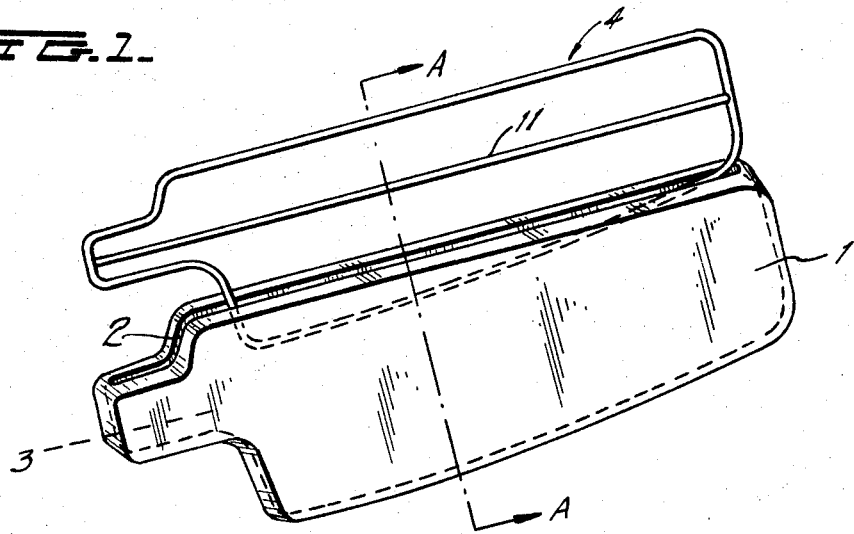
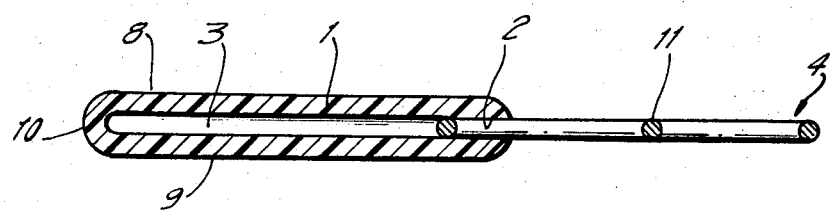
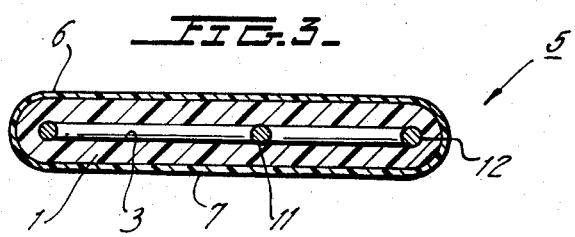
INVENTORS
GERHARD HERR
WILLY O. TREBER
BY
Ostrolenk, Faber, Gerb & Soffen
ATTORNEYS

SUNVISOR, ESPECIALLY FOR MOTOR DRIVEN VEHICLES

This invention relates to padded sunvisors for motor vehicles, such as automobiles and trucks, and to a method of producing such sunvisors. Sunvisors usually have a generally rectangular, flat contour. They consist of a relatively stiff inner rectangular reinforcing member or frame which is connected by hinges to the vehicle. The frame is covered by layers of foamed polymer or plastic material. These layers are usually wrapped with an exterior cover of polymer or plastics material which is bonded to the exterior surfaces of the layers within.

The manufacture of such sunvisors requires a succession of production stages which causes their mass production to be time consuming and costly.

Among the objects of the invention is the provision of a padded visor for motor vehicles which may be manufactured in a short time with few production steps.

In accordance with the invention, the body of the sunvisor enclosure is formed of the contour and dimensions of the desired visor and includes a pocket. A stiffening frame is insertable through a border slit or opening into the pocket. As a further feature, the pocket is closed by fusing or welding of the edges of the visor exterior. The invention eliminates the heretofore required accurate super-positioning of the layers of a sunvisor over an intermediate stiffening member and the subsequent joining of the layers along all their borders into an enclosed, complete sunvisor having the desired contour and dimensions.

The foregoing and other objects of the present invention will be explained in connection with an exemplification thereof, shown in the annexed drawings wherein:

FIG. 1 is a perspective view of a sunvisor in accordance with the invention with a part of the stiffening member partially inserted;

FIG. 2 is a cross-sectional view of the same sunvisor along lines A—A of FIG. 1;

FIG. 3 is a cross-sectional view along lines A-A of FIG. 1, with the stiffening member fully inserted and surrounded on all sides, and the slit in the sunvisor pocket closed.

The padded sunvisor shown in FIGS. 1 to 3 comprises a body 1 of foamed plastic, e.g., a known foamed polymer plastic, such as those described in MODERN PLASTICS ENCYCLOPEDIA 1967, Volume 44, pages 348-380, published by McGraw-Hill, New York, and in the references cited in this publication. The TEXTBOOK OF POLYMER SCIENCE by Fred. W. Billmeyer, Jr., Copyright 1962 by John Wiley & Sons, Inc., Second Printing, 1964, deals with the different polymers suitable for making solid plastic foam bodies and foamed solid polymers and plastics (pages 230-233, 477-479, 481, 496).

Body 1 has an internal, flat pocket 3. Body 1 is formed of two layers 8, 9 of material, which are united along all border regions or edges 10 but one. The entrance into pocket 3 is defined by slit opening 2 along that unsealed one of the generally four border regions of body 1.

Within space 3 is held a relatively stiff and strong reinforcing member 4, which reinforces Body 1 against deformation. Stiffening member 4 is flat and of a generally rectangular shape corresponding to the contour of the pocket 3 in body 1. As an example, member 4, may be made of a strong steel wire frame of the required contour and shape and may have one or more cross-wires 11 for increasing its stiffness and resistance against deformation. Stiffening member 4 is inserted through opening 2 into the pocket space 3, as seen in FIG. 2, until the entire member 4 is within body 1. Thereafter, the surface regions of body 1 adjoining its opening 12 are united to form a continuous enclosure surrounding stiffening inner member 4 (FIG.3). Slit opening 2 is closed at 12 by any known polymer plastic junction process, such as thermal fusion, ultrasonic vibration welding, and the like.

Thereafter or substantially simultaneously with the uniting, the exterior of body 1 is wrapped with a known fusible plastic foil layer 7, completing the formation of a sunvisor having an inner, relatively strong stiffening member 4. Layer 7 may be formed of known thermally or otherwise fusible plastic polymer materials which will fuse to the underlying exterior surface of body 1.

Body 1 of sunvisor 5 in FIG. 3, may thus be formed by a continuous rational procedure with any known type of stiffening member 4 and with any known polymer plastic foam material.

Individual bodies 1, may be produced by cutting a long molded block of polymer foam material, having an elongated slit opening in it, into individual body 1 sections.

The padded polymer foam sunvisors of predetermined contour shape and dimensions are produced in a single processing stage, irrespective of the structure of the inner stiffening member or the manner of joining each body 1 into an integral sunvisor. The invention avoids the need for superposing accurately shaped polymer foam layers and their intermediate inner stiffening member and the joining and then welding along their entire periphery in order to obtain padded sunvisors of desired contour and dimensions.

Although the invention has been described above with respect to its preferred embodiments, it will be understood that many variations and modifications will be obvious to those skilled in the art. It is preferred, therefore, that the scope of the invention be limited not by the specific disclosure herein but only by the appended claims.

What is claimed is:

1. A sunvisor for motor vehicles comprising,
   a generally flat and rectangular body having generally rectangular border edge regions of predetermined contour and dimensions; said body being formed of two layers of foamed material which are formed in said contour and dimensions and being of material which is inherently stable to retain shape of said body without reinforcement; said layers define between them an inner rectangularly shaped hollow pocket space;
   all but at least one of said border edge regions of said two layers being united to enclose said pocket space; said at least one of said four border edge regions having a slit opening communicating with said pocket space through which an inner stiffening member is insertable into said pocket space; and a generally flat and rigid stiffening member having a generally rectangular border edge region, corresponding to the shape of said body, being positioned within said pocket space for giving said body added stiffness and resistance against deformation beyond that afforded by said body alone; the periphery of said body being unaffected by insertion of said stiffening member;

all said border edge regions of said body together, constituting a substantially continuous border region overlying and enclosing said border regions of said inner stiffening member.

2. The sunvisor of claim 1, wherein said layers of said body are comprised of foam plastic pads.

3. The sunvisor of claim 2 wherein said body is surrounded by a foil layer which encloses said sunvisor.

4. The sunvisor of claim 1, wherein all said border edge regions, including said at least one region, being united, thereby sealing said stiffening member in said pocket space.

* * * * *